(12) United States Patent
Yamada

(10) Patent No.: US 9,185,632 B2
(45) Date of Patent: Nov. 10, 2015

(54) INFORMATION PROCESSING SYSTEM, INFORMATION STORAGE APPARATUS, AND LOCATION INFORMATION STORING METHOD

(71) Applicant: Kazuhiro Yamada, Kanagawa (JP)

(72) Inventor: Kazuhiro Yamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/483,336

(22) Filed: Sep. 11, 2014

(65) Prior Publication Data
US 2015/0080025 A1    Mar. 19, 2015

(30) Foreign Application Priority Data

Sep. 17, 2013  (JP) ................................. 2013-191366
Aug. 29, 2014  (JP) ................................. 2014-174775

(51) Int. Cl.
  *H04W 64/00*   (2009.01)
  *H04W 4/02*    (2009.01)
  *H04W 48/04*   (2009.01)

(52) U.S. Cl.
  CPC ................ *H04W 48/04* (2013.01); *H04W 4/02* (2013.01)

(58) Field of Classification Search
  CPC ..... H04W 64/00; H04W 4/02; H04W 64/003; H04W 64/006; H04W 48/04; H04L 29/08657; G01S 5/02
  See application file for complete search history.

(56) References Cited

U.S. PATENT DOCUMENTS

| 7,529,549 | B2 | 5/2009 | Yamada et al. | |
|---|---|---|---|---|
| 7,869,082 | B2 | 1/2011 | Hayashida et al. | |
| 2007/0143444 | A1* | 6/2007 | Kamiya et al. | 709/219 |
| 2007/0229891 | A1* | 10/2007 | Yanagi et al. | 358/1.15 |
| 2012/0311189 | A1 | 12/2012 | Yamada | |
| 2013/0027726 | A1 | 1/2013 | Yamada | |
| 2013/0185386 | A1* | 7/2013 | Hashida et al. | 709/217 |

FOREIGN PATENT DOCUMENTS

| JP | 2009-140139 | 6/2009 |
|---|---|---|
| JP | 2010-044454 | 2/2010 |
| JP | 4588162 | 11/2010 |
| JP | 2011-118626 | 6/2011 |
| JP | 2014-016897 | 1/2014 |

OTHER PUBLICATIONS

U.S. Appl. No. 14/202,188, filed Mar. 10, 2014.

* cited by examiner

*Primary Examiner* — Ted Wang
(74) *Attorney, Agent, or Firm* — IPUSA, PLLC

(57) ABSTRACT

An information storage apparatus includes a transmission unit that transmits configuration information to an operation terminal connected to the information storage apparatus, the configuration information indicating whether the information storage apparatus is configured to store location information of the operation terminal; a control unit that performs a process requested by a request sent from the operation terminal; and a storage control unit that stores, in a storage unit of the information storage apparatus, the location information of the operation terminal in association with information related to the process requested by the request. When the configuration information indicates that the information storage apparatus is configured to store the location information, the control unit performs the process requested by the request only when the location information is received from the operation terminal together with the request.

10 Claims, 15 Drawing Sheets

FIG.9

| ITEM | EXAMPLE | DESCRIPTION |
|---|---|---|
| DATE AND TIME | 2013/5/28 19:01 | DATE AND TIME WHEN REQUEST IS RECEIVED |
| EXECUTION USER ID | ○○○ | USER WHO SENT REQUEST |
| DEVICE NAME | ×××  | NAME OF DEVICE USED TO SEND REQUEST |
| LATITUDE, LONGITUDE | 35.658704, 139.745408 | LATITUDE AND LONGITUDE OF DEVICE |
| EXECUTION RESULT | FAILED | FAILED OR SUCCESSFUL |
| FILE NAME | yamada/1.file/estimate.doc | REQUESTED FILE |

| DATE AND TIME | EXECUTION USER ID | DEVICE NAME | LATITUDE, LONGITUDE | EXECUTION RESULT | FILE NAME |
|---|---|---|---|---|---|
| 2013/5/28 19:01 | ○○○ | ×××  | 35.658704, 139.745408 | SUCCESSFUL | yamada/1.file/estimate.doc |
| 2013/5/28 19:30 | ○○○ | ×××  | 35.668710, 139.746510 | SUCCESSFUL | yamada/1.file/Scan_20120607.pdf |
| 2013/5/28 20:00 | ○○○ | ×××  | 35.664404, 139.756000 | SUCCESSFUL | yamada/1.file/estimate.doc |

(B)

| DATE AND TIME | EXECUTION USER ID | DEVICE NAME | LATITUDE, LONGITUDE | EXECUTION RESULT | FILE NAME |
|---|---|---|---|---|---|
| 2013/5/28 19:30 | ○○○ | ×××  | 35.668710, 139.746510 | SUCCESSFUL | yamada/1.file/estimate.doc |

(C)

| DATE AND TIME | EXECUTION USER ID | DEVICE NAME | LATITUDE, LONGITUDE | EXECUTION RESULT | FILE NAME |
|---|---|---|---|---|---|
| 2013/5/28 19:02 | ○○○ | ×××  | 35.658704, 139.745408 | SUCCESSFUL | yamada/1.file/estimate.doc |

FIG.11

| ITEM | EXAMPLE 1 | EXAMPLE 2 | EXAMPLE 3 | DESCRIPTION |
|---|---|---|---|---|
| DATE AND TIME | 2013/8/19 19:00 | 2013/8/20 20:00 | 2013/8/21 21:00 | DATE AND TIME WHEN REQUEST IS RECEIVED |
| EXECUTION USER ID | Yamada | Satoh | Suzuki | USER WHO SENT REQUEST |
| DEVICE NAME | ○○○ | △△△ | ■■■ | NAME OF DEVICE USED TO SEND REQUEST |
| OPERATION TYPE | READING | PROJECTION | PRINTING | TYPE OF PERFORMED PROCESS |
| LATITUDE, LONGITUDE | 35.44, 139.74 | 36.44, 130.74 | 35.55, 139.84 | LATITUDE AND LONGITUDE OF DEVICE |
| EXECUTION RESULT | SUCCESSFUL | FAILED | FAILED | FAILED OR SUCCESSFUL |
| FILE NAME | Yamada/file/test.txt | All/file/hoge.pdf | Suzuki/file/hoge.rpcs | REQUESTED FILE |

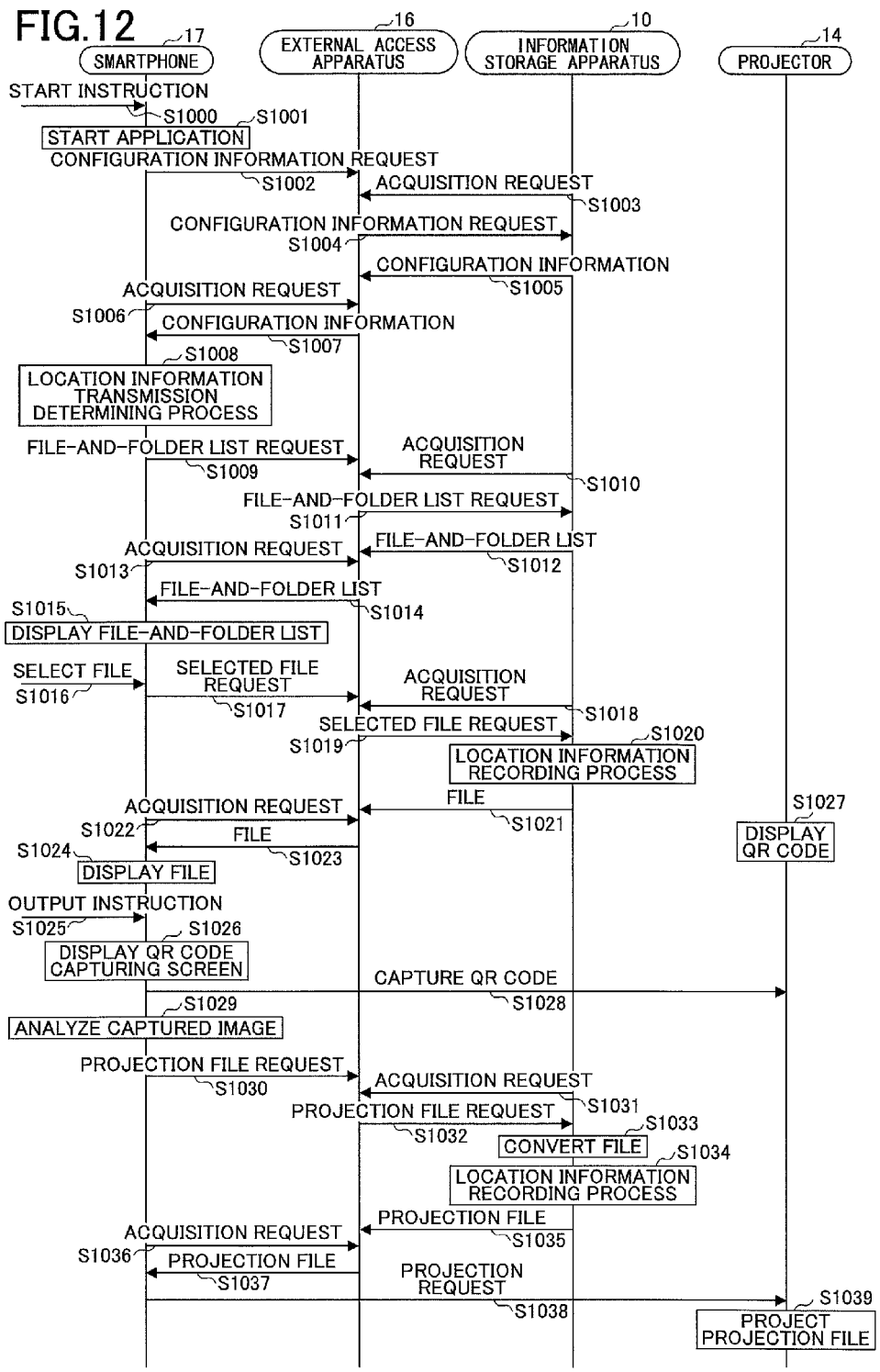

FIG.14

| DATE AND TIME | USER ID | DEVICE NAME | OPERATION TYPE | LATITUDE, LONGITUDE | RESULT | FILE NAME |
|---|---|---|---|---|---|---|
| 2013/8/19 19:00 | Yamada | ○○○ | READING | 35.44, 139.74 | SUCCESSFUL | Yamada/file/test.doc |
| 2013/8/19 19:01 | Yamada | ○○○ | PROJECTION | 35.44, 139.74 | SUCCESSFUL | Yamada/file/test.doc |
| 2013/8/19 20:00 | Yamada | ○○○ | READING | 35.44, 139.74 | SUCCESSFUL | Yamada/file/hoge.pdf |
| 2013/8/19 20:01 | Yamada | ○○○ | PRINTING | 35.44, 139.74 | SUCCESSFUL | Yamada/file/hoge.pdf |

FIG.15

| DATE AND TIME | USER ID | DEVICE NAME | OPERATION TYPE | LATITUDE, LONGITUDE | RESULT | FILE NAME |
|---|---|---|---|---|---|---|
| 2013/8/19 19:00 | Yamada | ○○○ | READING | 35.44, 139.74 | SUCCESSFUL | Yamada/file/test.doc |
| 2013/8/20 19:01 | Yamada | ○○○ | WRITING (CONVERSION) | 35.44, 139.74 | SUCCESSFUL | Yamada/file/test.jpg |
| 2013/8/20 19:01 | Yamada | ○○○ | READING | 35.44, 139.74 | SUCCESSFUL | Yamada/file/test.jpg |

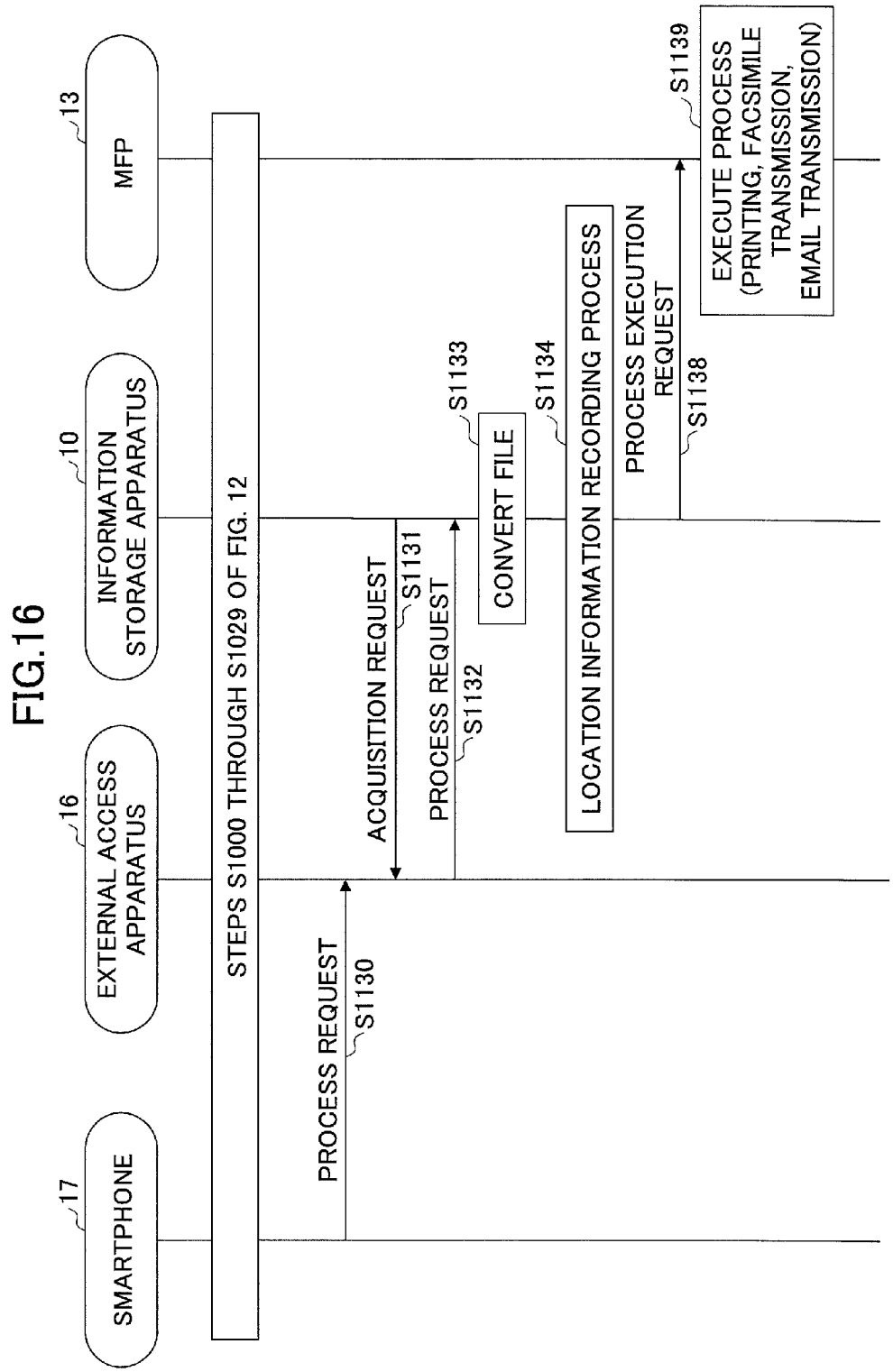

INFORMATION PROCESSING SYSTEM, INFORMATION STORAGE APPARATUS, AND LOCATION INFORMATION STORING METHOD

CROSS-REFERENCE TO RELATED APPLICATIONS

The present application is based upon and claims the benefit of priority of Japanese Patent Application No. 2013-191366 filed on Sep. 17, 2013 and Japanese Patent Application No. 2014-174775 filed on Aug. 29, 2014, the entire contents of which are incorporated herein by reference.

BACKGROUND OF THE INVENTION

1. Field of the Invention

An aspect of this disclosure relates to an information processing system, an information storage apparatus, and a location information storing method.

2. Description of the Related Art

Japanese Laid-Open Patent Publication No. 2011-118626, for example, discloses a technology that makes it possible to obtain a shared file on an internal network from an external network without compromising security.

Also, Japanese Laid-Open Patent Publication No. 2010-044454, for example, discloses a technology for preventing leakage of information in an electronic document downloaded onto a user terminal.

There exists an information processing system where information stored in an information storage apparatus on a network can be viewed from an operation terminal being operated by a user. In the information processing system, an operation terminal on a different network is allowed to access the information stored in the information storage apparatus after the operation terminal is successfully authenticated.

With the related-art information processing system, however, it is not possible to store location information of the operation terminal that has accessed the information stored in the information storage apparatus. That is, with the related-art information processing system, it is not possible to manage locations from which the information stored in the information storage apparatus is accessed.

In still other words, the related-art information processing system cannot store location information of operation terminals that have accessed the information stored in the information storage apparatus from a network that is different from the network where the information storage apparatus is located.

SUMMARY OF THE INVENTION

In an aspect of this disclosure, there is provided an information storage apparatus including a transmission unit that transmits configuration information to an operation terminal connected to the information storage apparatus, the configuration information indicating whether the information storage apparatus is configured to store location information of the operation terminal; a control unit that performs a process requested by a request sent from the operation terminal; and a storage control unit that stores, in a storage unit of the information storage apparatus, the location information of the operation terminal in association with information related to the process requested by the request. When the configuration information indicates that the information storage apparatus is configured to store the location information, the control unit performs the process requested by the request only when the location information is received from the operation terminal together with the request.

BRIEF DESCRIPTION OF THE DRAWINGS

FIG. 9 is a table illustrating an exemplary configuration of an activity monitoring log;

FIG. 10 is a drawing illustrating exemplary activity monitoring logs;

FIG. 11 is a table illustrating another exemplary configuration of an activity monitoring log;

FIG. 12 is a sequence chart illustrating another exemplary process performed by a service providing system;

FIG. 14 is a table illustrating another exemplary configuration of an activity monitoring log;

FIG. 15 is a table illustrating another exemplary configuration of an activity monitoring log; and FIG. 16 is a sequence chart illustrating another exemplary process performed by a service providing system.

DESCRIPTION OF THE PREFERRED EMBODIMENTS

Embodiments of the present invention are described below with reference to the accompanying drawings. In the embodiments, a service providing system is an example of an information processing system.

<System Configuration>

Figure 1:
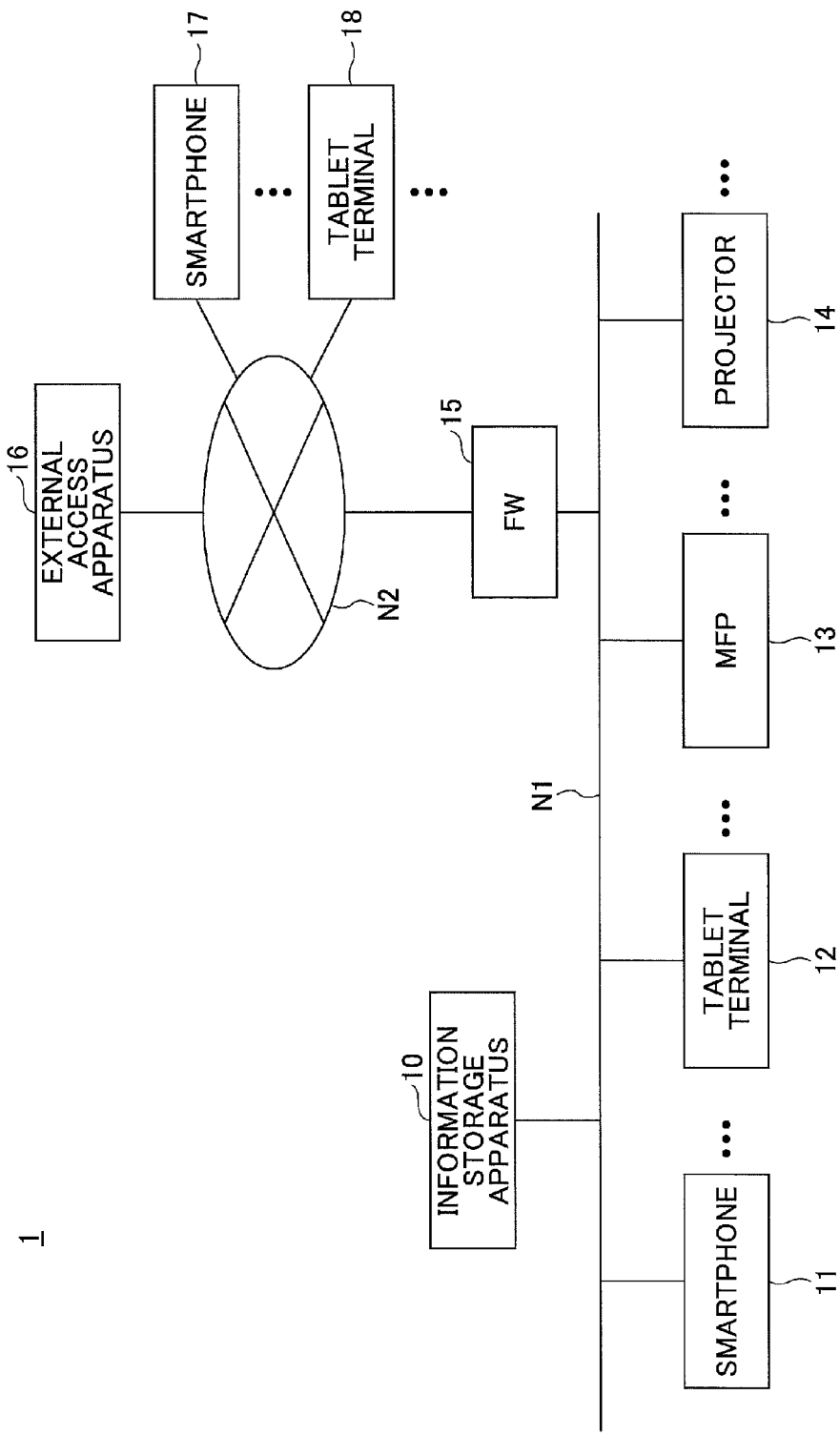
FIG. 1 is a drawing illustrating an exemplary configuration of a service providing system.

FIG. 1 is a drawing illustrating an exemplary configuration of a service providing system 1 according to a first embodiment. As illustrated by FIG. 1, the service providing system 1 may include an information storage apparatus 10, one or more smartphones 11, one or more tablet terminals 12, one or more multifunction peripherals (MFP) 13, and one or more projectors 14 that are connected to a network N1 such as an intranet.

The service providing system 1 may also include an external access apparatus 16, one or more smartphones 17, and one or more tablet terminals 18 that are connected to a network N2 such as the Internet. The network N1 and the network N2 are connected to each other via a firewall (FW) 15.

In the present embodiment, it is assumed that the information storage apparatus 10, the smartphones 11, the tablet terminals 12, the MFPs 13, and the projectors 14 are located within an intranet environment. On the other hand, it is assumed that the external access apparatus 16, the smartphones 17, and the tablet terminals 18 are located in an Internet environment. Below, for descriptive purposes, the smartphones 11, the tablet terminals 12, the MFPs 13, the projectors 14, the smartphones 17, and the tablet terminals 18 may be referred to in the singular form.

The network N1 is, for example, a private network such as an intranet. The smartphone 11 and the tablet terminal 12 are examples of operation terminals that are carried and operated by users. An operation terminal represents any device or apparatus that a user operates. Examples of operation terminals include, in addition to the smartphone 11 and the tablet terminal 12, a cell phone and a notebook PC.

The MFP 13 and the projector 14 are examples of electronic apparatuses that provide services (e.g., printing, scanning, and projection). An electronic apparatus represents any apparatus that can provide a service. Examples of electronic apparatuses include, in addition to the MFP 13 and the projector 14, a printer, a scanner, a copier, and an image display apparatus.

The MFP 13 is an example of an image forming apparatus. The MFP 13 includes an imaging function, an image forming function, and a communication function, and can be used as a printer, a facsimile machine, a scanner, and a copier. The projector 14 is an example of an image projecting apparatus. The projector 14 includes a projecting function and a communication function.

The information storage apparatus 10 is an example of an information sharing apparatus. The information storage apparatus 10 performs, for example, advanced processes that cannot be performed by the MFP 13 and the projector 14, and also functions as a file server. Also, the information storage apparatus 10 causes operation terminals such as the smartphone 11 and the tablet terminal 12 to display information. Further, the information storage apparatus 10 may be configured to collaborate with operation terminals such as the smartphone 11 and the tablet terminal 12 to provide services that employ electronic apparatuses such as the MFP 13 and the projector 14. The information storage apparatus 10 may be implemented by multiple computers (distributed configuration).

The information storage apparatus 10 regularly communicates with the external access apparatus 16 to monitor requests received by the external access apparatus 16 from operation terminals such as the smartphone 17 and the tablet terminal 18. When a request has been received by the external access apparatus 16 from an operation terminal on the network N2, the information storage apparatus 10 obtains the request from the external access apparatus 16 and performs a process corresponding to the obtained request.

Similarly to the smartphone 11 and the tablet terminal 12, the smart phone 17 and the tablet terminal 18 on the network N2 are also examples of operation terminals that are carried and operated by users. Operation terminals such as the smartphone 17 and the tablet terminal 18, which are on the network N2 that is different from the network N1 where the information storage apparatus 10 is located, send requests to the external access apparatus 16. The external access apparatus 16 stores requests received from operation terminals on the network N2, and provides the stored requests to the information storage apparatus 10 in response to a request from the information storage apparatus 10.

In the service providing system 1, with the above configuration or process, an operation terminal on the network N2 can access information stored in the information storage apparatus 10 on the network N1.

<Hardware Configuration>

Figure 2:
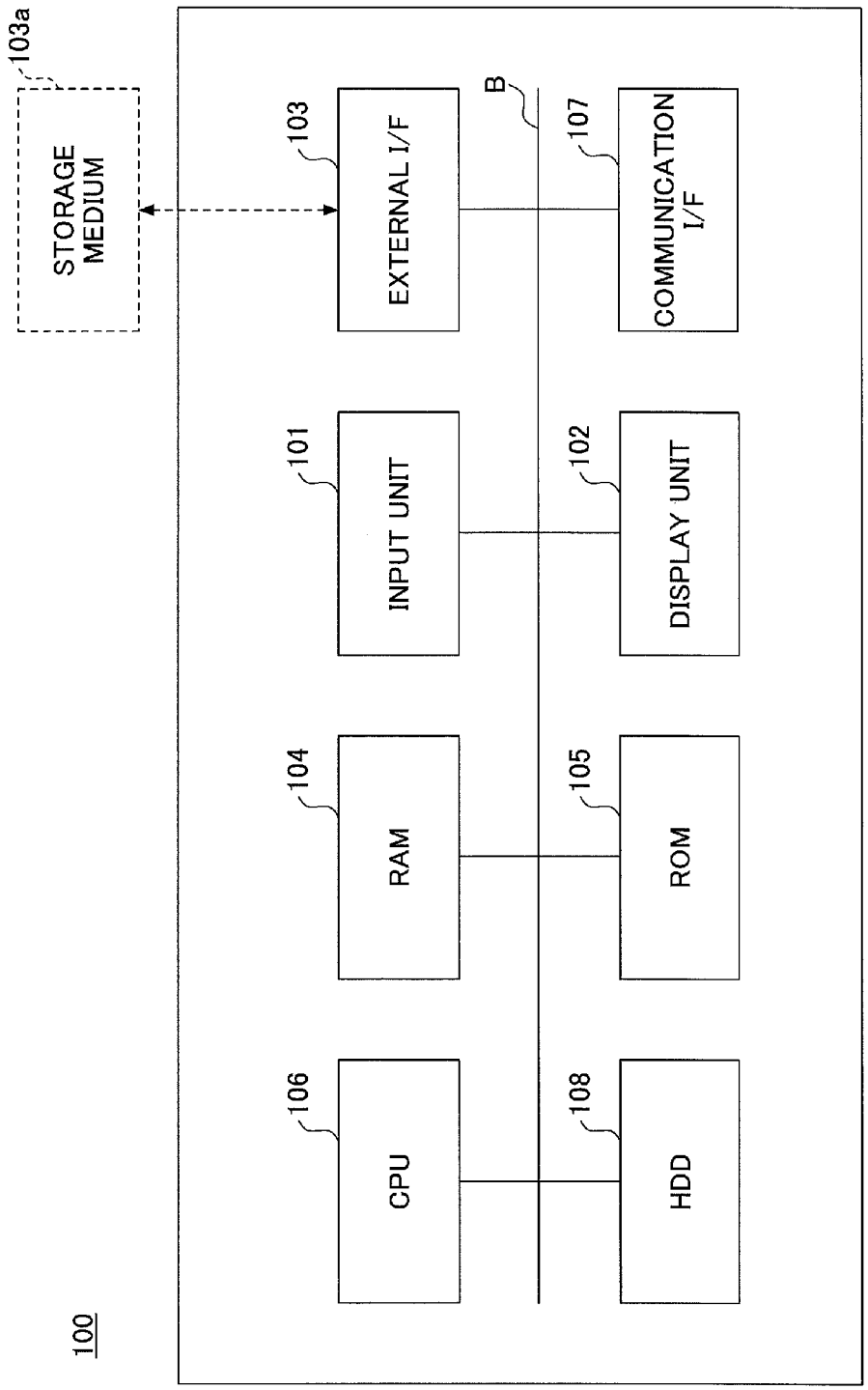
FIG. 2 is a block diagram illustrating an exemplary hardware configuration of a computer system.

The information storage apparatus 10 may be implemented by a computer system with a hardware configuration as illustrated by FIG. 2. Operation terminals such as the smartphone 11, the tablet terminal 12, the smartphone 17, and the tablet terminal 18 may also have a hardware configuration as illustrated by FIG. 2. FIG. 2 is a block diagram illustrating an exemplary hardware configuration of a computer system 100 according to the present embodiment.

As illustrated by FIG. 2, the computer system 100 may include an input unit 101, a display unit 102, an external I/F 103, a random access memory (RAM) 104, a read-only memory (ROM) 105, a central processing unit (CPU) 106, a communication I/F 107, and a hard disk drive (HDD) 108 that are connected to each other via a bus B. The input unit 101 and the display unit 102 may be configured to be connected to the computer system 100 when necessary.

The input unit 101 includes, for example, a keyboard and a mouse, and is used to input instructions (or operation signals) to the computer system 100. The display unit 102 displays, for example, processing results of the computer system 100. The communication I/F 107 is an interface for connecting the computer system 100 to the network N1. The computer system 100 can perform data communications with other apparatuses such as operation terminals, electronic apparatuses, and the external access apparatus 16 via the communication I/F 107.

The HDD 108 is a non-volatile storage device for storing various programs and data. For example, the HDD 108 stores basic software or an operating system (OS) for controlling the entire computer system 100, and application software for providing various functions on the OS. The HDD 108 may manage the stored programs and data using a file system and/or a database (DB).

The external I/F 103 is an interface between the computer system 100 and an external storage such as a storage medium 103a. The computer system 100 can read and write data from and to the storage medium 103a via the external I/F 103. The storage medium 103a may be implemented by, for example, a flexible disk, a compact disk (CD), a digital versatile disk (DVD), a secure digital (SD) memory card, or a universal serial bus (USB) memory.

The ROM 105 is a non-volatile semiconductor memory (storage unit) that can retain programs and data even when power is turned off. For example, the ROM 105 stores programs and data such as a basic input/output system (BIOS) that is executed when the computer system 100 is turned on, and system and network settings of the computer system 100. The RAM 104 is a volatile semiconductor memory (storage unit) for temporarily storing programs and data.

The CPU (processor) 106 loads programs and data from storage units (e.g., the ROM 105 and the HDD 108) into the RAM 104 and executes the loaded programs to control the computer system 100 and to implement various functions of the computer system 100.

With the above hardware configuration, the computer system 100 can provide various functions as described below.

<Software Configuration>

[Information Storage Apparatus]

Figure 3:
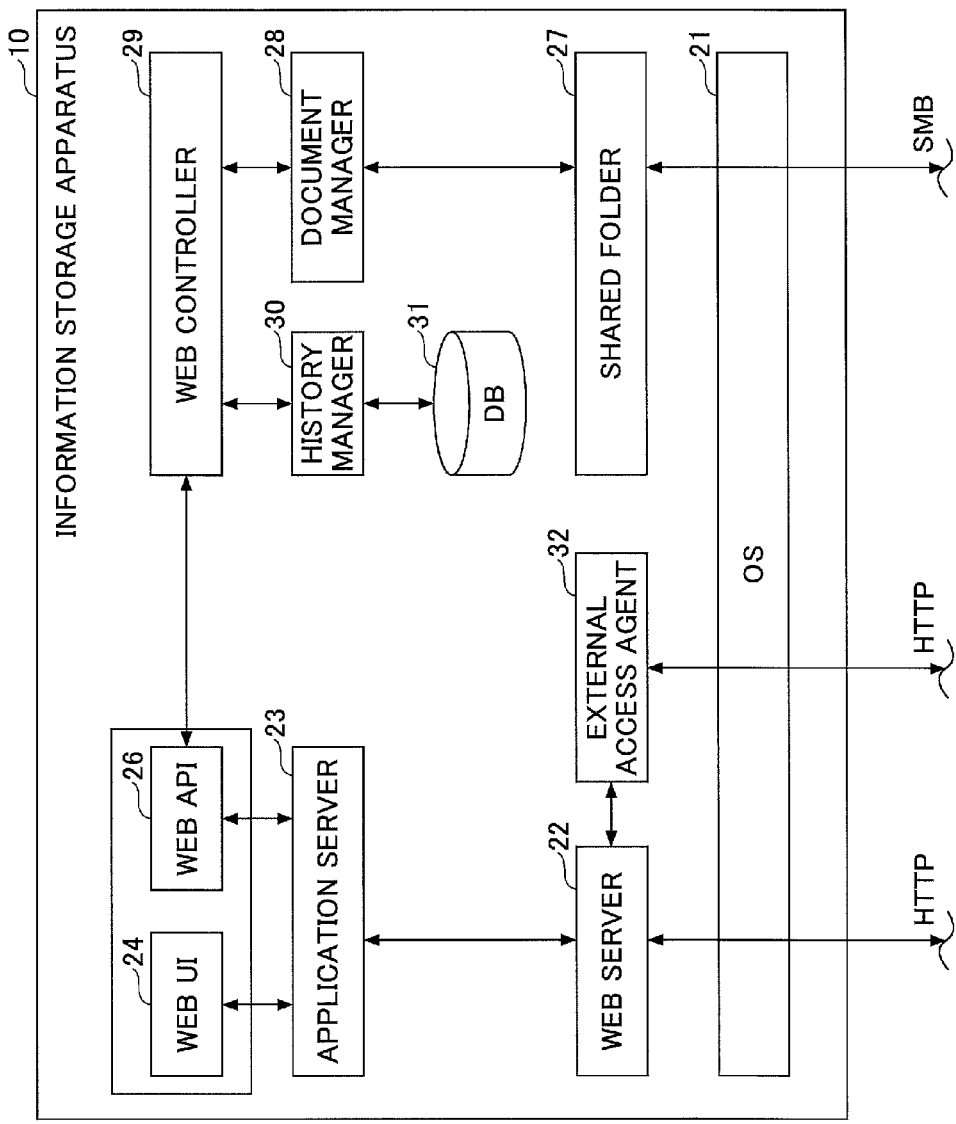
FIG. 3 is a block diagram illustrating an exemplary functional configuration of an information storage apparatus.

The information storage apparatus 10 of the present embodiment may include functional units (or processing blocks) as illustrated by FIG. 3. FIG. 3 is a block diagram illustrating an exemplary functional configuration of the information storage apparatus 10. The information storage apparatus 10 executes a program(s) to implement an OS 21, a Web server 22, an application server 23, a Web UI 24, a Web API 26, a shared folder 27, a document manager 28, a Web controller 29, a history manager 30, a database (DB) 31, and an external access agent 32.

The OS 21 is an operating system for controlling the entire information storage apparatus 10. The OS 21 is implemented by, for example, Windows (registered trademark) or Linux (registered trademark).

The Web server 22 is software for sending and receiving information via the Hypertext Transfer Protocol (HTTP). The Web server 22 is implemented by, for example, Apache (registered trademark) or IIS (registered trademark).

The application server 23 is, for example, software that runs as a plug-in of the Web server 22. The application server 23 is implemented by, for example, Tomcat (registered trademark).

The Web UI 24 displays, for example, a system configuration screen in response to an HTTP request. For example, the Web UI 24 allows a user to change system configurations on the system configuration screen using a Web browser (not shown).

The Web API (application programming interface) 26 is available via the network N1. The Web API 26 receives an HTTP request, performs a process corresponding to the received HTTP request, and returns an HTTP response. That is, the Web API 26 is a predefined interface for receiving requests from operation terminals such as the smartphone 11 and the tablet terminal 12, and may be implemented by functions or classes.

The Web API 26 of the information storage apparatus 10 may be provided as a software development kit (SDK) to developers of applications installed in operation terminals. Application developers can develop applications using the SDK. The SDK may also be provided to third vendors other than the vendor of the information storage apparatus 10. The third vendors can develop applications using the SDK. Applications developed using the SDK can be installed in operation terminals.

Thus, providing the Web API 26 of the information storage apparatus 10 as an SDK to third vendors makes it possible to provide operation terminals with not only applications developed by the vendor of the information storage apparatus 10 but also applications developed by the third vendors.

The shared folder 27 is a folder that is made public on the network N1 via the Server Message Block (SMB) protocol. Users can access the shard folder 27 using operation terminals such as the smartphone 11 and the tablet terminal 12. The shared folder 27 is an example of a storage unit.

The document manager 28 manages files placed in the shared folder 27, and performs data conversion on the files in response to requests from the Web controller 29. In the present embodiment, a file is an exemplary format of data. The Web controller 29 controls the document manager 28 and the history manager 30 in response to requests from the Web API 26.

The DB 31 stores an activity monitoring log(s). As described later, the activity monitoring log includes location information. The history manager 30 manages the activity monitoring log stored in the DB 31. The history manager 30 also performs a location information recording process. In response to an activity monitoring log request from an operation terminal, the history manager 30 outputs the activity monitoring log stored in the DB 31 to a file, and provides the file to the operation terminal.

The external access agent 32 communicates regularly with the external access apparatus 16, e.g., by polling the external apparatus 16, and receives, from the external access apparatus 16, a request sent from an operation terminal on the network N2 that is different from the network N1 where the information storage apparatus 10 is located. Then, the external access agent 32 sends the request received from the external access apparatus 16 via the Web server 22 and the application server 23 to the Web API 26 to cause the Web API 26 to perform a process corresponding to the request.

When a request is received from the external access agent 32, the Web API 26 determines that the request is sent from an operation terminal on the network N2 such as the Internet that is different from the network N1 where the information storage apparatus 10 is located.

Roughly two processes are running on the information storage apparatus 10. One process involves the Web server 22, the application server 23, the Web UI 24, the Web API 26, and the external access agent 32. Another process involves the shared folder 27, the document manager 28, the Web controller 29, the history manager 30, and the DB 31. The Web API 26 performs interprocess communications with the Web controller 29.

[Operation Terminal]

Figure 4:
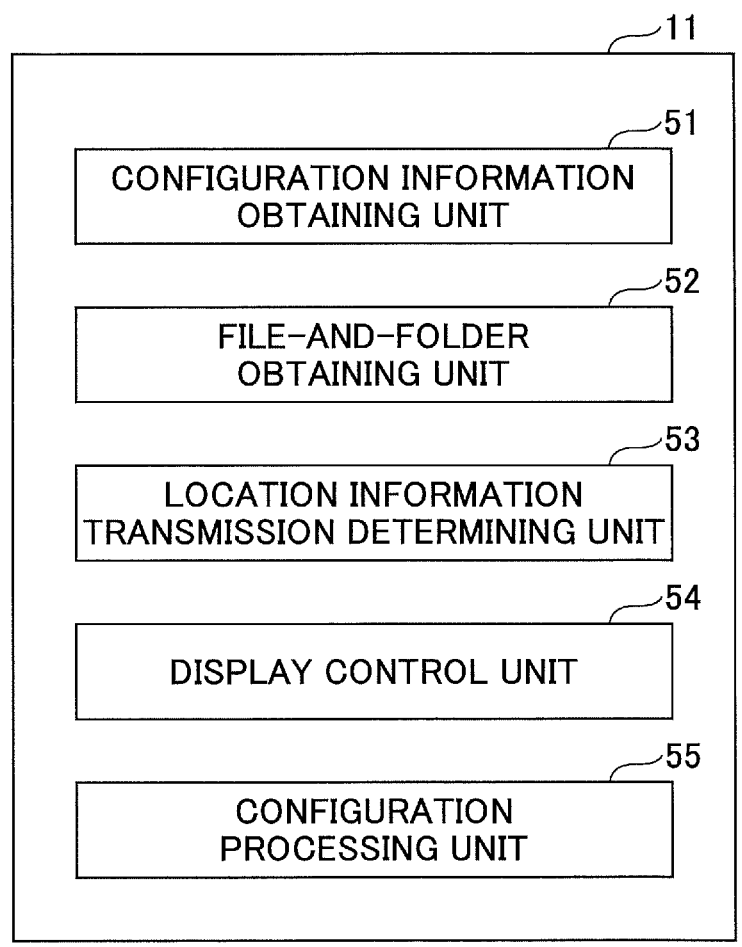
FIG. 4 is a block diagram illustrating an exemplary functional configuration of a smartphone.

In the descriptions below, the smartphone 11 is used as an example of an operation terminal. The smartphone 11 of the present embodiment may include functional units (or processing blocks) as illustrated by FIG. 4. FIG. 4 is a block diagram illustrating an exemplary functional configuration of the smartphone 11.

The smartphone 11 executes an application(s) to implement a configuration information obtaining unit 51, a file-and-folder obtaining unit 52, a location information transmission determining unit 53, a display control unit 54, and a configuration processing unit 55.

The configuration information obtaining unit obtains configuration information from the information storage apparatus 10 at a predetermined timing, for example, when an application is started. The file-and-folder obtaining unit 52 obtains, for example, a file-and-folder list of files and/or folders, thumbnail images, and files from the information storage apparatus 10.

The location information transmission determining unit 53 determines whether to send location information based on configuration information. The display control unit 54 performs a control process to display the file-and-folder list, the thumbnail images, and the files obtained by the file-and-folder obtaining unit 52 on, for example, the display unit 102. The configuration processing unit 55 receives a request to register the information storage apparatus 10 from a user via, for example, a system configuration screen. When the user or the smartphone 11 is successfully authenticated for access to the information storage apparatus 10, the configuration processing unit 55 registers the information storage apparatus 10. The configuration processing unit 55 also receives a request to set configuration information from an administrator via, for example, the system configuration screen, and requests the information storage apparatus 10 to set the configuration information.

<Processes>

Figure 5:
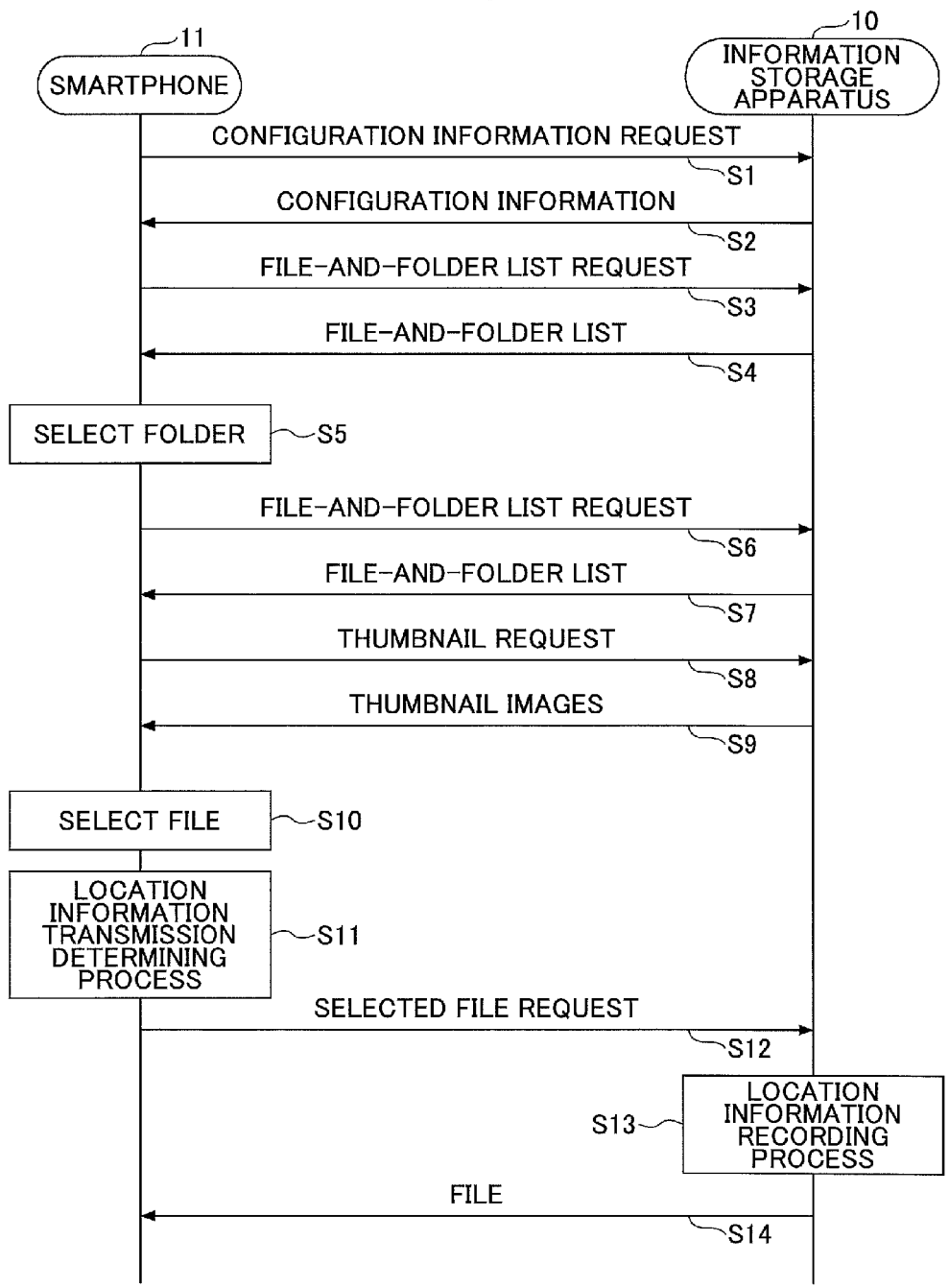
FIG. 5 is a sequence chart illustrating an exemplary process performed by a service providing system.
Figure 6:
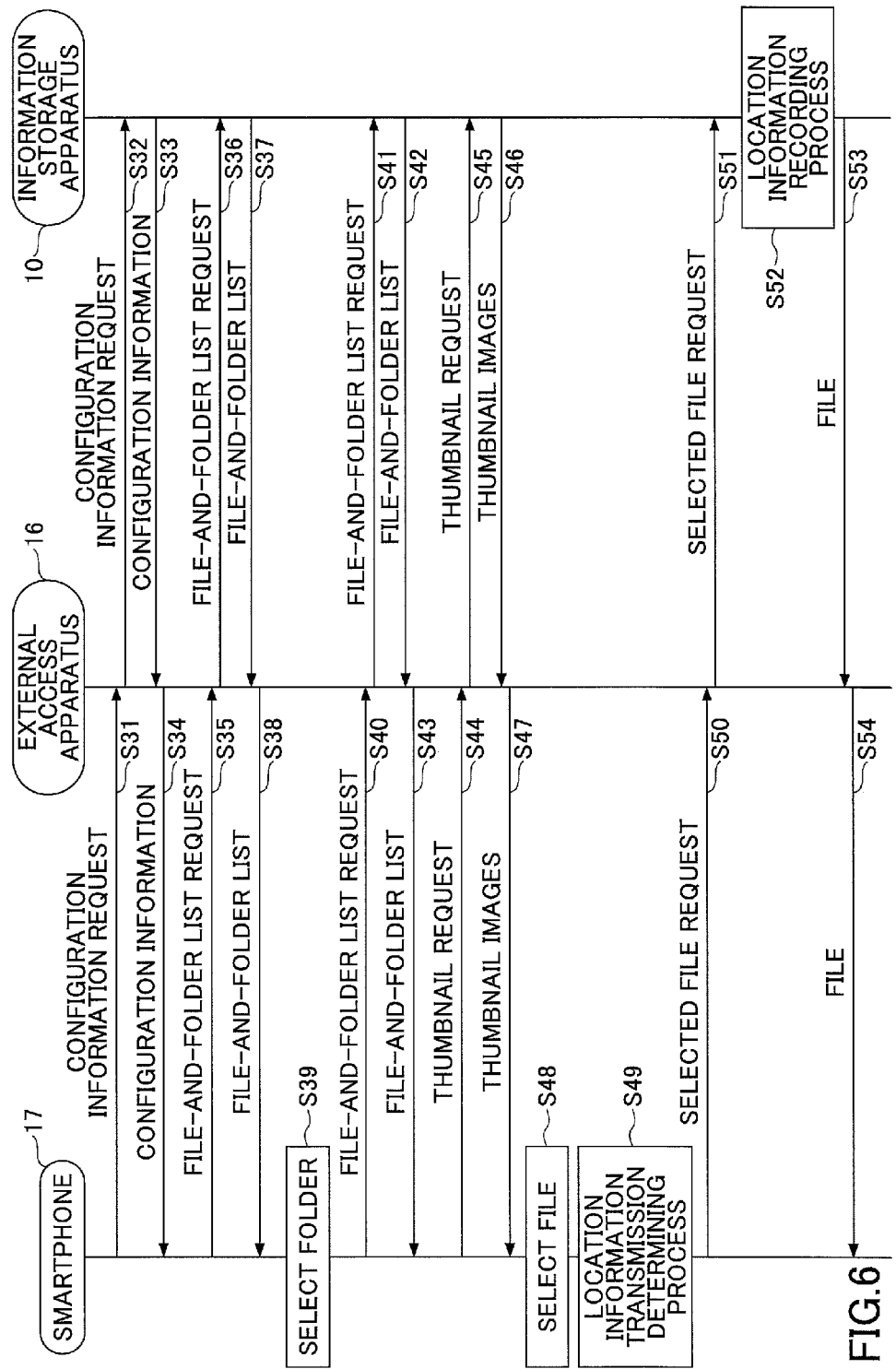
FIG. 6 is a sequence chart illustrating another exemplary process performed by a service providing system.

Exemplary processes performed by the service providing system 1 of the present embodiment are described below. In the exemplary processes described below, files stored in the information storage apparatus 10 are displayed by the smartphone 11 and the smartphone 17. FIG. 5 illustrates a process where a file stored in the information storage apparatus 10 is displayed by the smartphone 11. FIG. 6 illustrates a process where a file stored in the information storage apparatus 10 is displayed by the smartphone 17.

FIG. 5 is a sequence chart illustrating an exemplary process performed by the service providing system 1 of the present embodiment.

A user operates the smartphone 11 to start an application for accessing the information storage apparatus 10. The application for accessing the information storage apparatus 10 may be implemented by a dedicated application or by adding a function in the form of, for example, a plug-in to a general-purpose application.

When the application is started, the configuration information obtaining unit 51 of the smartphone 11 sends, at step S1, a configuration information request to the information storage apparatus 10. At step S2, the Web API 26 of the information storage apparatus 10 sends configuration information to the smartphone 11. The configuration information includes a setting indicating whether an activity monitoring log is to be recorded (i.e., whether the information storage apparatus 10 is configured to record an activity monitoring log). Hereafter, this setting is referred to as an "activity monitoring log setting". When the activity monitoring log setting is enabled, the information storage apparatus 10 is configured to record activity monitoring logs. When the activity monitoring log setting is disabled, the information storage apparatus 10 is configured to not record activity monitoring logs.

At step S3, the user operates the smartphone 11 to select a file-and-folder list display option (instruction, command, etc.). The file-and-folder obtaining unit 52 of the smartphone 11 sends a file-and-folder list request to the information storage apparatus 10.

At step S4, the document manager 28 of the information storage apparatus 10 sends a file-and-folder list of files and/or folders stored in the shared folder 27 to the smartphone 11. The display control unit 54 of the smartphone 11 receives and displays the file-and-folder list.

At step S5, the user operates the smartphone 11 to select, for example, a folder from the file-and-folder list. At step S6, the file-and-folder obtaining unit 52 of the smartphone 11 sends a file-and-folder list request to the information storage apparatus 10 to request a file-and-folder list of files and/or folders in the selected folder. At step S7, the document manager 28 of the information storage apparatus 10 sends the file-and-folder list of files and/or folders in the selected folder to the smartphone 11.

Here, it is assumed that the file-and-folder list sent at step S7 includes files, and thumbnail images are necessary to display the files in the file-and-folder list. At step S8, the file-and-folder obtaining unit 52 of the smartphone 11 sends a thumbnail request to the information storage apparatus 10 to request thumbnail images necessary to display the files in the file-and-folder list.

At step S9, the document manager 28 of the information storage apparatus 10 sends thumbnail images corresponding to the thumbnail request to the smartphone 11. The display control unit 54 of the smartphone 11 displays the file-and-folder list and the thumbnail images received from the information storage apparatus 10.

At step S10, the user operates the smartphone 11 to select a file from the file-and-folder list. At step S11, the location information transmission determining unit 53 of the smartphone 11 performs a location information transmission determining process.

In the location information transmission determining process, the location information transmission determining unit 53 refers to the configuration information received from the information storage apparatus 10 to check the activity monitoring log setting. When the activity monitoring log setting is disabled, the location information transmission determining unit 53 determines that transmission of location information is not necessary, and the process proceeds to step S12.

On the other hand, when the activity monitoring log setting is enabled, the location information transmission determining unit 53 determines whether the smartphone 11 is on the same network N1 as the information storage apparatus 10. When the smartphone 11 is on the same network N1 as the information storage apparatus 10, the location information transmission determining unit 53 determines that transmission of location information is not necessary, and the process proceeds to step S12. On the other hand, when the smartphone 11 is on the network N2 that is different from the network N1 where the information storage apparatus 10 is located, the location information transmission determining unit 53 determines that transmission of location information is necessary.

In the case of the service providing system 1 of FIG. 1, because the smartphone 11 is on the same network N1 as the information storage apparatus 10, the location information transmission determining unit 53 determines that transmission of location information is not necessary.

At step S12, the file-and-folder obtaining unit 52 sends a selected file request to the information storage apparatus 10 to request the file selected by the user. At step S13, the Web API 26 of the information storage apparatus 10 performs a location information recording process. Details of the location information recording process are described later.

In the location information recording process, an activity monitoring log including location information is recorded when the activity monitoring log setting is enabled and when the selected file request is from an operation terminal on the network N2 that is different from the network N1 where the information storage apparatus 10 is located. In the case of the service providing system 1 of FIG. 1, because the smartphone 11 is on the same network N1 as the information storage apparatus 10, no activity monitoring log including location information is recorded.

At step S14, the document manager 28 of the information storage apparatus 10 sends the file corresponding to the selected file request to the smartphone 11. The display control unit 54 of the smartphone 11 receives and displays the file.

FIG. 6 is a sequence chart illustrating another exemplary process performed by the service providing system 1 of the present embodiment.

A user operates the smartphone 17 to start an application for accessing the information storage apparatus 10. The application for accessing the information storage apparatus 10 may be implemented by a dedicated application or by adding a function in the form of, for example, a plug-in to a general-purpose application. When the smartphone 17 is on the network N2 that is different from the network N1 where the information storage apparatus 10 is located, the application for accessing the information storage apparatus 10 send requests for the information storage apparatus 10 to the external access apparatus 16.

When the application is started, the configuration information obtaining unit 51 of the smartphone 17 sends, at step S31, a configuration information request to the external access apparatus 16. The external access apparatus 16 stores the configuration information request received from the smartphone 17 until requested by the information storage apparatus 10. At step S32, the external access agent 32 of the information storage apparatus 10 obtains the configuration information request sent by the smartphone 17 from the external access apparatus 16.

At step S33, the Web API 26 of the information storage apparatus 10 sends configuration information to the external access apparatus 16. At step S34, the external access apparatus 16 sends the configuration information to the smartphone 17. The configuration information includes an activity monitoring log setting indicating whether the information storage apparatus 10 is configured to record an activity monitoring log.

At step S35, the user operates the smartphone 17 to select a file-and-folder list display option (instruction, command, etc.). The file-and-folder obtaining unit 52 of the smartphone 17 sends a file-and-folder list request to the external access apparatus 16.

The external access apparatus 16 stores the file-and-folder list request received from the smartphone 17 until requested by the information storage apparatus 10. At step S36, the external access agent 32 of the information storage apparatus 10 obtains the file-and-folder list request sent by the smartphone 17 from the external access apparatus 16.

At step S37, the document manager 28 of the information storage apparatus 10 sends a file-and-folder list of files and/or folders stored in the shared folder 27 to the external access apparatus 16. At step S38, the external access apparatus 16 sends the file-and-folder list to the smartphone 17. The display control unit 54 of the smartphone 17 receives and displays the file-and-folder list.

At step S39, the user operates the smartphone 17 to select, for example, a folder from the file-and-folder list. At step S40, the file-and-folder obtaining unit 52 of the smartphone 17 sends a file-and-folder list request to the external access apparatus 16 to request a file-and-folder list of files and/or folders in the selected folder.

The external access apparatus 16 stores the file-and-folder list request received from the smartphone 17 until requested by the information storage apparatus 10. At step S41, the external access agent 32 of the information storage apparatus 10 obtains the file-and-folder list request sent by the smartphone 17 from the external access apparatus 16.

At step S42, the document manager 28 of the information storage apparatus 10 sends the file-and-folder list of files and/or folders in the selected folder to the external access apparatus 16. At step S43, the external access apparatus 16 sends the file-and-folder list of files and/or folders in the selected folder to the smartphone 17.

Here, it is assumed that the file-and-folder list sent at step S43 includes files, and thumbnail images are necessary to display the files in the file-and-folder list.

At step S44, the file-and-folder obtaining unit 52 of the smartphone 17 sends a thumbnail request to the external access apparatus 16 to request thumbnail images necessary to display the files in the file-and-folder list. At step S45, the external access agent 32 of the information storage apparatus 10 obtains the thumbnail request sent by the smartphone 17 from the external access apparatus 16.

At step S46, the document manager 28 of the information storage apparatus 10 sends thumbnail images corresponding to the thumbnail request to the external access apparatus 16. At step S47, the external access apparatus 16 sends the thumbnail images received from the information storage apparatus 10 to the smartphone 17. The display control unit 54 of the smartphone 17 displays the file-and-folder list and the thumbnail images received from the external access apparatus 16.

At step S48, the user operates the smartphone 17 to select a file from the file-and-folder list. At step S49, the location information transmission determining unit 53 of the smartphone 17 performs a location information transmission determining process.

In the location information transmission determining process, the location information transmission determining unit 53 refers to the configuration information received from the information storage apparatus 10 via the external access apparatus 16 to check the activity monitoring log setting. When the activity monitoring log setting is disabled, the location information transmission determining unit 53 determines that transmission of location information is not necessary, and the process proceeds to step S50.

On the other hand, when the activity monitoring log setting is enabled, the location information transmission determining unit 53 determines whether the smartphone 17 is on the same network N1 as the information storage apparatus 10. When the smartphone 17 is on the same network N1 as the information storage apparatus 10, the location information transmission determining unit 53 determines that transmission of location information is not necessary, and the process proceeds to step S50. On the other hand, when the smartphone 17 is on the network N2 that is different from the network N1 where the information storage apparatus 10 is located, the location information transmission determining unit 53 determines that transmission of location information is necessary.

In the case of the service providing system 1 of FIG. 1, because the smartphone 17 is on the network N2 that is different from the network N1 where the information storage apparatus 10 is located, the location information transmission determining unit 53 determines that transmission of location information is necessary.

At step S50, the file-and-folder obtaining unit 52 sends a selected file request to the external access apparatus 16 to request the file selected by the user. In this case, the file-and-folder obtaining unit 52 sends a selected file request including location information of the smartphone 17. The location information indicates a location such as latitude and longitude of the smartphone 17 that are obtained via a global positioning system (GPS).

At step S51, the external access agent 32 of the information storage apparatus 10 obtains the selected file request, which is sent by the smartphone 17 and includes the location information, from the external access apparatus 16.

At step S52, the Web API 26 of the information storage apparatus 10 performs a location information recording process. Details of the location information recording process are described later.

In the location information recording process, an activity monitoring log including location information is recorded when the activity monitoring log setting is enabled and when the selected file request is from an operation terminal on the network N2 that is different from the network N1 where the information storage apparatus 10 is located. In the case of the service providing system 1 of FIG. 1, because the smartphone 17 is on the network N2 that is different from the network N1 where the information storage apparatus 10 is located, an activity monitoring log including location information is recorded.

Here, when location information of the smartphone 17 on the network N2 is not found in the selected file request during the location information recording process, subsequent steps to be performed in response to the selected file request are canceled.

At step S53, the document manager 28 of the information storage apparatus 10 sends the file corresponding to the selected file request to the external access apparatus 16. At step S54, the external access apparatus 16 sends the file received from the information storage apparatus 10 to the smartphone 17. The display control unit 54 of the smartphone 17 receives and displays the file.

In the exemplary processes illustrated by FIGS. 5 and 6, the information storage apparatus 10 performs the location information recording process when the selected file request is received. Alternatively, the information storage apparatus 10 may be configured to also perform the location information recording process when the file-and-folder list request(s) and/or the thumbnail request is received. In this case, a step of performing the location information recording process is added after one or more of the steps of receiving the file-and-folder list requests and the thumbnail request in FIGS. 5 and 6.

Figure 7:
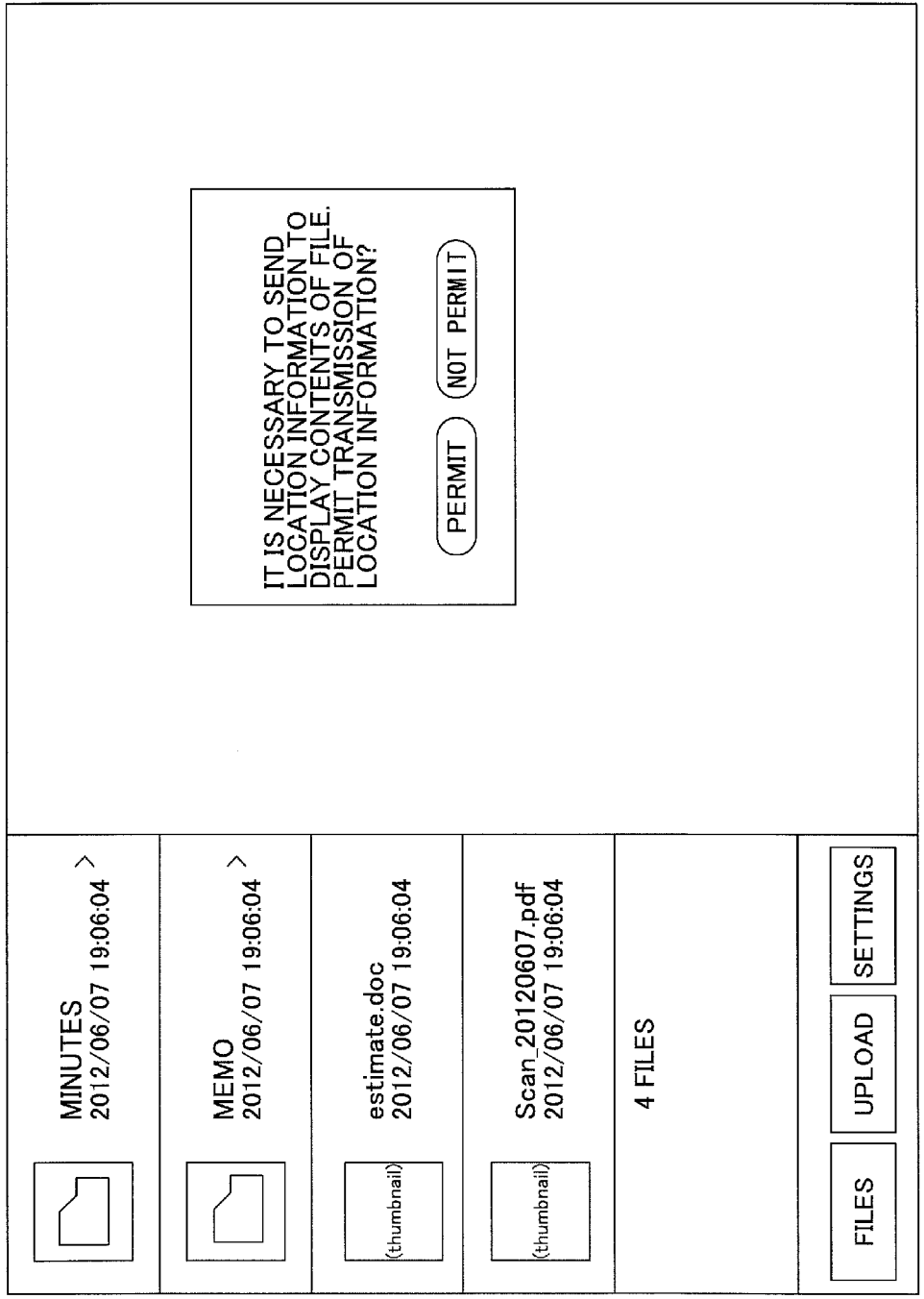
FIG. 7 is a drawing illustrating an exemplary confirmation screen.

The location information transmission determining unit 53 may be configured to display a confirmation screen as illustrated by FIG. 7 to ask the user whether to permit transmission of location information when it is determined that transmission of location information is necessary during the location information transmission determining process of step S49. FIG. 7 is a drawing illustrating an exemplary confirmation screen used to ask the user whether to permit transmission of location information.

When the user permits transmission of location information on the confirmation screen, the user is allowed to send a selected file request. On the other hand, when the user does not permit transmission of location information on the confirmation screen, the user is not allowed to send a selected file request.

Figure 8:
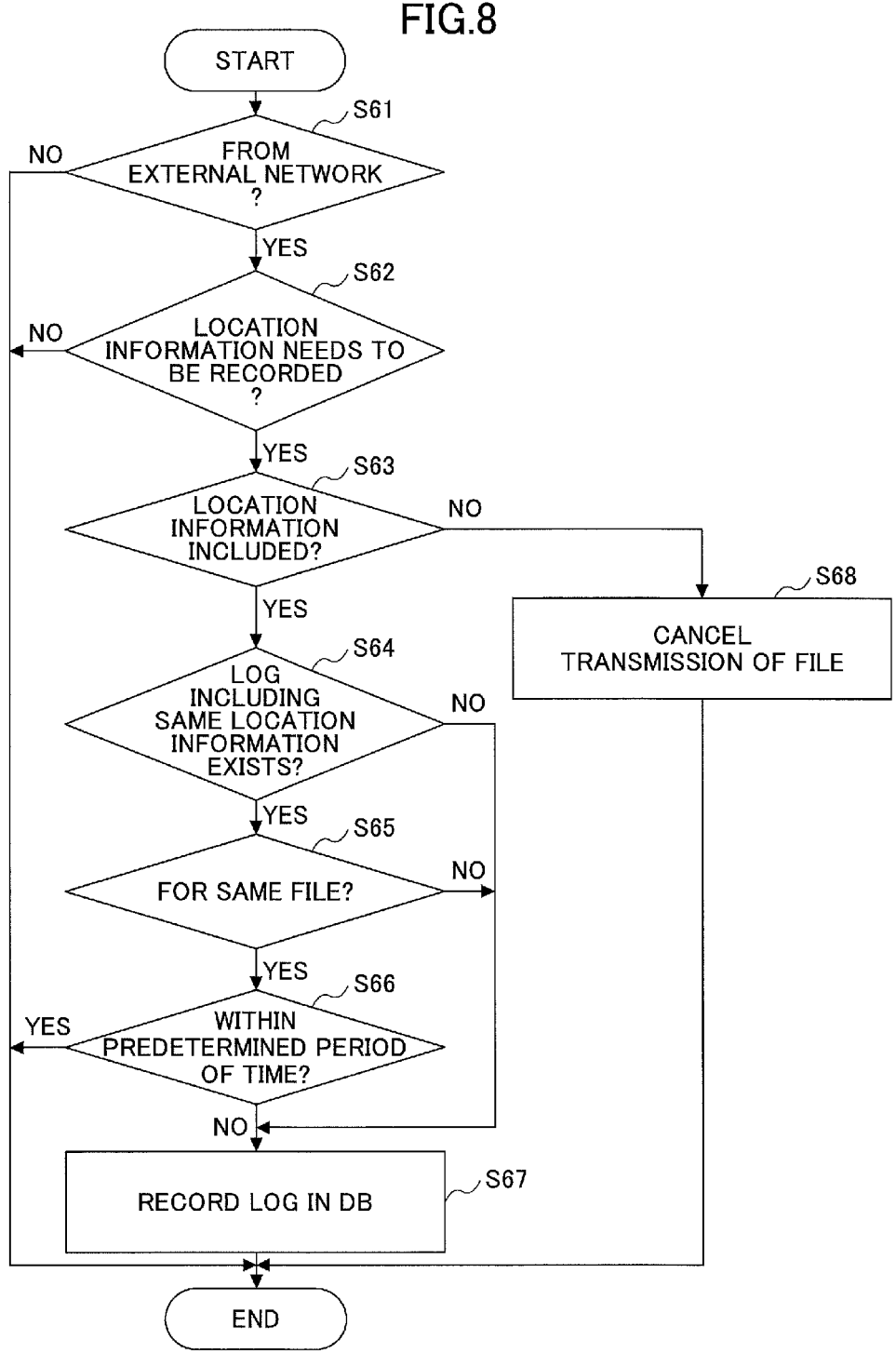
FIG. 8 is a flowchart illustrating an exemplary location information recording process.

FIG. 8 is a flowchart illustrating an example of the location information recording process performed in FIGS. 5 and 6.

At step S61, the Web API 26 of the information storage apparatus 10 determines whether a received request is from an external network other than the network N1. When the request is received from the external access agent 32, the Web API 26 determines that the request is from an external network. When the request is received from an apparatus or device other than the external access agent 32, the Web API 26 determines that the request is not from an external network.

When the request is not from an external network, the Web API 26 determines that recording of an activity monitoring log including location information is not necessary. When the request is from an external network, the Web API 26 proceeds to step S62 and determines whether recording of location information is necessary based on an activity monitoring log setting indicating whether the information storage apparatus 10 is configured to record an activity monitoring log. When the activity monitoring log setting is enabled, the Web API 26 determines that recording of location information is necessary.

On the other hand, when the activity monitoring log setting is disabled, the Web API 26 determines that recording of location information is not necessary and does not record an activity monitoring log including location information. When recording of location information is necessary, the Web API 26 proceeds to step S63 and determines whether location information is included in the request from the external network.

When location information is not included in the request, the Web API 26 proceeds to step S68 and cancels transmission of a file requested by the received request. On the other hand, when location information is included in the request, the Web API 26 proceeds to step S64 and determines whether an activity monitoring log(s) including the same location information has already been recorded in the DB 31 by referring to the history manager 30.

When no activity monitoring log including the same location information has been recorded in the DB 31, the Web API 26 proceeds to step S67 and requests the history manager 30 to record an activity monitoring log in the DB 31. On the other hand, when an activity monitoring log(s) including the same location information has already been recorded in the DB 31, the Web API 26 proceeds to step S65 and determines whether the activity monitoring log including the same location information is related to a request for the same file as that requested by the received request.

When the activity monitoring log including the same location information is not related to a request for the same file, the Web API 26 proceeds to step S67 and requests the history manager 30 to record an activity monitoring log in the DB 31. On the other hand, when the activity monitoring log including the same location information is related to a request for the same file, the Web API 26 proceeds to step S66, and determines whether the time that the request for the same file was made is within a predetermined period of time before the received request was made.

When the time that the request for the same file was made is not within the predetermined period of time, the Web API 26 proceeds to step S67 and requests the history manager 30 to record an activity monitoring log in the DB 31. On the other hand, when the time that the request for the same file was made is within the predetermined period of time, the Web API 26 determines that recording of the location information is not necessary and does not request the history manager 30 to record an activity monitoring log including the location information.

Thus, at steps S64 through S66, the location information, the requested file, and the date and time of a current (received) request are compared with those of activity monitoring logs already recorded in the DB 31 to prevent a duplicate access monitoring log from being recorded. For example, when a user accesses the same file multiple times from the same location within a predetermined period of time, many activity monitoring logs that are different from each other only in requested date and time may be recorded in the DB 31, resulting in increased noise. Steps S64 through S66 makes it possible to prevent such a problem.

FIG. 9 is a table illustrating an exemplary configuration of an activity monitoring log. The activity monitoring log of FIG. 9 includes data items (or fields) such as a date and time, an execution user ID, a device name, latitude and longitude, an execution result, and a file name. The date and time indicates a date and time when a request is received (or sent) from an operation terminal such as the smartphone 11. The execution user ID is identification information of a user who has sent a request. The device name is identification information of an operation terminal such as the smartphone 11 used by a user to send a request. The latitude and longitude is an example of location information indicating a location from which a user has sent a request. The execution result indicates whether a process performed in response to a request has been successful or failed. The file name is identification information of a file requested (or accessed) by a user. Thus, an activity monitoring log stores a file name specified in a request from an operation terminal and the date and time of the request in association with location information of the operation terminal.

Next, how to determine whether to add an activity monitoring log to the DB 31 is described with reference to FIG. 10.

FIG. 10 is a drawing illustrating exemplary activity monitoring logs. FIG. 10 (A) illustrates activity monitoring logs already recorded in the DB 31. FIG. 10 (B) illustrates an activity monitoring log (or information to be added as an activity monitoring log) that includes the same latitude and longitude as the second activity monitoring log in FIG. 10 (A) and a file name that is different from the file name in the second activity monitoring log in FIG. 10 (A). The activity monitoring log of FIG. 10 (B) can be added to the DB 31 because it includes a file name different from the file name in the second activity monitoring log in FIG. 10 (A). FIG. 10 (C) illustrates an activity monitoring log (or information to be added as an activity monitoring log) that includes the same latitude and longitude and the same file name as the first activity monitoring log in FIG. 10 (A). When the date and time in the activity monitoring log of FIG. 10 (C) is within a predetermined period of time from the date and time in the first activity monitoring log in FIG. 10 (A), the activity monitoring log of FIG. 10 (C) cannot be added to the DB 31.

Activity monitoring logs recorded in the DB 31 through the location information recording process can be obtained via, for example, the system configuration screen displayed by the Web UI 24. For example, an administrator of the service providing system 1 can request the Web UI 24 of the information storage apparatus 10 to obtain activity monitoring logs via the configuration processing unit 55 of the smartphone 11.

The configuration processing unit 55 of the smartphone 11 can obtain activity monitoring logs in the form of, for example, a compressed (e.g., zipped) csv file. Thus, an administrator of the service providing system 1 can later view activity monitoring logs related to requests sent to the information storage apparatus 10 from the network N2 that is different from the network N1 where the information storage apparatus 10 is located. By viewing the activity monitoring logs, the administrator can determine locations from which information stored in the information storage apparatus 10 is accessed.

Exemplary processes in the service providing system 1 where an operation terminal such as the smartphone 11 displays a file obtained from the information storage apparatus 10 are described above. However, the present invention is not limited to the above described examples. For example, an electronic apparatus such as the MFP 13 or the projector 14 in the service providing system 1 may be used to obtain information (e.g., a file) from the information storage apparatus 10 and print or project the obtained information.

Exemplary activity monitoring logs described above are used to record history information related to file operations. However, an activity monitoring log may be used to record other types of information. FIG. 11 is a table illustrating another exemplary configuration of an activity monitoring log. In FIG. 11, an activity monitoring log includes a field (or an information item) for an operation type (or a process type of a performed process) in addition to the fields illustrated in FIG. 9.

Examples of process types (operation types) include "printing" where a file obtained from the information storage apparatus 10 is printed by the MFP 13, "facsimile transmission" where a file obtained from the information storage apparatus 10 is faxed by the MFP 13, "projection" where a file obtained from the information storage apparatus 10 is projected by the projector 14, "scanning" where a file scanned by the MFP 13 is stored in the information storage apparatus 10, "writing" where a file is added to the information storage apparatus 10, "deletion" where a file stored in the information storage apparatus 10 is deleted, and "reading" where a file is obtained from the information storage apparatus 10.

FIG. 12 is a sequence chart illustrating another exemplary process performed by the service providing system 1 of the present embodiment. FIG. 12 illustrates an exemplary process where the smartphone 17 as an example of an operation terminal sends a file to the projector 14 and requests the projector 14 to project the file. Below, detailed descriptions of a process similar to the above described process of recording of an activity monitoring log are omitted.

A user selects a target application from applications displayed on the smartphone 17, and enters a start instruction (step S1000). The smartphone 17 starts the target application (step S1001), and sends a configuration information request to the external access apparatus 16 (step S1002).

When an acquisition request is received from the information storage apparatus 10 (step S1003), the external access apparatus 16 sends the configuration information request received from the smartphone 17 to the information storage apparatus 10 (step S1004). In response to the configuration information request, the information storage apparatus 10 sends configuration information to the external access apparatus 16 (step S1005).

When an acquisition request is received from the smartphone 17 (step S1006), the external access apparatus 16 sends the configuration information received from the information storage apparatus 10 to the smartphone 17 (step S1007). When receiving the configuration information from the external access apparatus 16, the smartphone 17 performs a location information transmission determining process (step S1008). The location information transmission determining process is similar to step S11 of FIG. 5, and its descriptions are omitted here.

Next, similarly to the corresponding steps of FIG. 6, the smartphone 17 sends a file-and-folder list request via the external access apparatus 16 to the information storage apparatus 10 to request a file-and-folder list of files and/or folders stored in the information storage apparatus 10 (steps S1009 through S1011). Next, similarly to the corresponding steps of FIG. 6, the information storage apparatus 10 sends a file-and-folder list of files and/or folders stored in the information storage apparatus 10 via the external access apparatus 16 to the smartphone 17 (steps S1012 through S1014).

The smartphone 17 displays a list of files and/or folders on the display unit 102 of the smartphone 17 based on the file-and-folder list received from the information storage apparatus 10 (step S1015). Then, the smartphone 17 receives an instruction from the user to select a file in the displayed list of files and/or folders (step S1016). When a file is selected, similarly to the corresponding steps of FIG. 6, the smartphone 17 sends a selected file request via the external access apparatus 16 to the information storage apparatus 10 to obtain the selected file (steps S1017 through S1019).

Figure 13:
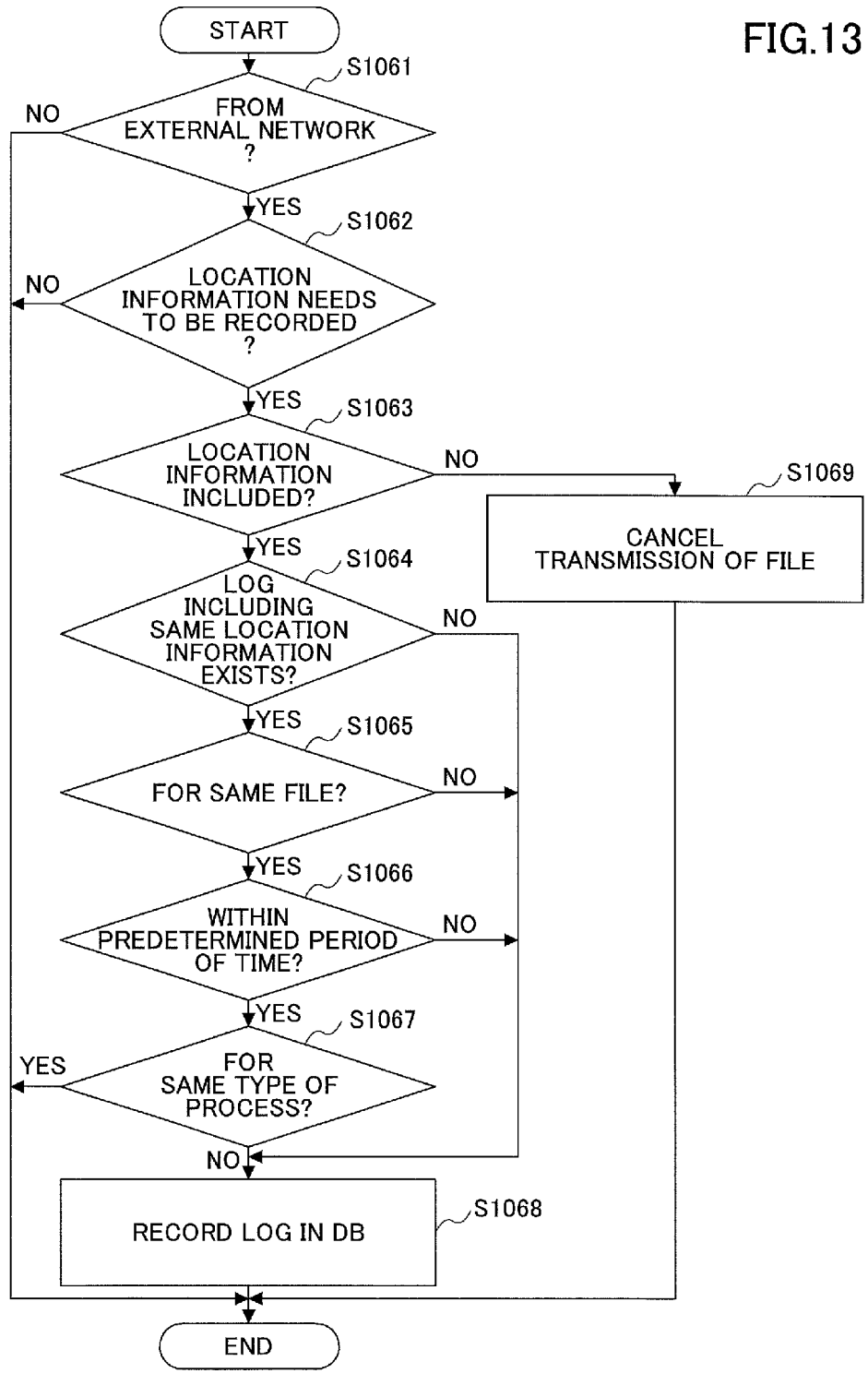
FIG. 13 is a flowchart illustrating another exemplary location information recording process.

The information storage apparatus 10 performs a location information recording process as illustrated by FIG. 13 (step S1020). The location information recording process of FIG. 13 includes, in addition to steps of FIG. 8, step S1067 that is performed after step S1066 (which corresponds to step S66 of FIG. 8) when an already-registered activity monitoring log including the same location information and the same file name as a current request is determined to include a date and time that is within a predetermined period of time before the date and time of the current request. At step S1067, whether the already-registered activity monitoring log and the current request are for the same type of process (i.e., operation type) is determined. The location information recording process of FIG. 13 makes it possible to record activity monitoring logs related to different processes for the same file that are requested by a user from the same location within a predetermined period of time. At step S1020, the information storage apparatus 10 records, for example, an activity monitoring log as illustrated in the first row of FIG. 14.

The information storage apparatus 10 identifies a file stored therein based on the selected file request received from the smartphone 17, and sends the identified file via the external access apparatus 16 to the smartphone 17 (steps S1021 through S1023).

The smartphone 17 displays the file received from the information storage apparatus 10 on the display unit 102 of the smartphone 17 (step S1024). When receiving an instruction from the user to output the displayed file (step S1025), the smartphone 17 displays a QR code (registered trademark)

capturing screen on the display unit 102 of the smartphone 17 (step S1026). On the other hand, the projector 14 displays a QR code including device information (e.g., identification information such as an IP address or a device number for identifying the projector 14, and capability information indicating file types that the projector 14 can handle and types of processes that the projector 14 can perform) (step S1027). The QR code may be displayed on a display unit of the projector 14 or projected by the projector 14. Also, a sticker on with the QR code is printed may be put on the projector 14.

While the QR code capturing screen is being displayed, the smartphone 17 captures an image of the QR code with an imaging unit of the smartphone (step S1028), and analyzes the captured image (step S1029). More specifically, the smartphone 17 detects the QR code in the captured image, and obtains the device information from the detected QR code.

Next, the smartphone 17 sends a projection file request for requesting a projection file to be projected via the external access apparatus 16 to the information storage apparatus 10 (steps S1030 through S1032). Based on the projection file request, the information storage apparatus 10 converts the file (which corresponds to the file displayed at step S1024) into a projection file with a file format that the projector 14 can project (step S1033). Here, it is assumed that the smartphone 17 includes the device information in the projection file request so that the information storage apparatus 10 can identify the file format that the projector 14 can project.

The information storage apparatus 10 performs a location information recording process as illustrated by FIG. 13, and records, for example, an activity monitoring log as illustrated in the second row of FIG. 14 (step S1034). In the activity monitoring log in the second row of FIG. 14, "projection" is recorded as the operation type. The information storage apparatus 10 determines that the operation type is "projection" based on the projection file request received from the smartphone 17.

Alternatively, the process requested by the projection file request may be considered as a file conversion process. In this case, the file conversion process may be recorded as a combination of "writing" or "file conversion" and "reading" as illustrated by FIG. 15.

The information storage apparatus 10 sends the projection file via the external access apparatus 16 to the smartphone 17 (steps S1035 through S1037). When receiving the projection file, the smartphone 17 sends the received projection file and a projection request to the projector 14 (step S1038). When receiving the projection file and the projection request, the projector 14 projects the projection file according to the projection request (step S1039). Although the exemplary process of FIG. 12 is described above using the projector 14, the process may be applied to other electronic apparatuses. For example, the projection request may be replaced with a print request, a facsimile transmission request, an email transmission request, or a scanning request to the MFP 13; or a display request, a writing request, an email transmission request, or a transfer request (requesting transfer of information to another apparatus) to a cloud board.

Also, the service providing system 1 may be configured such that the information storage apparatus 10 receives a report indicating completion of a process. For example, after the process of displaying a file (steps S1016 through S1024) is completed, i.e., after the file is displayed at step S1024, the smartphone 17 may send a file reception report via the external access apparatus 16 to the information storage apparatus 10. Then, when receiving the file reception report, the information storage apparatus 10 may record an execution result of the process. This configuration makes it possible to record "failed" as an execution result of the process when an error occurs during transmission of the file from the information storage apparatus 10 via the external access apparatus 16 to the smartphone 17.

Next, another exemplary output process is described with reference to FIG. 16. In the exemplary output process of FIG. 16, a file is output (e.g., printing, facsimile transmission, or email transmission) from the MFP 13. In the output process, steps S1000 through S1029 are first performed. Steps S1000 through S1026 are substantially the same as the corresponding steps of FIG. 12, and therefore their descriptions are omitted here. The smartphone 17 captures a QR code displayed on or attached to the MFP 13 at step S1028, and obtains device information of the MFP 13 at step S1029.

The smartphone 17 sends a process request including identification information for identifying a selected file, the device information of the MFP 13 to be used to output the selected file, and process conditions via the external access apparatus 16 to the information processing apparatus 10 (steps S1130 through S1132).

The identification information for identifying the selected file is represented by, for example, a file name or a file path. The process conditions indicate parameters of a process to be performed. Examples of process conditions include color/monochrome, N-up processing, and stapling for a printing process; a destination for a facsimile transmission process; and a file format and a destination address for an email transmission process.

When receiving the process request, the information storage apparatus 10 identifies the selected file to be processed, and converts the identified file into a file format that the MFP 13 can output (step S1133). When conversion of the identified file is not necessary (e.g., when the file is already in a file format that the MFP 13 can output, or the MFP 13 can convert the file into an appropriate file format), the information storage apparatus 10 does not convert the identified file.

Next, the information storage apparatus 10 performs a location information recording process as illustrated by FIG. 13, and records, for example, an activity monitoring log as illustrated in the fourth row of FIG. 14 (step S1134). The information storage apparatus 10 sends, to the MFP 13, a process execution request including the file in a file format that the MFP 13 can output and the process conditions (step S1138). The MFP 13 receives the process execution request, and performs a process according to the process execution request (step S1139).

Although the exemplary output process of FIG. 16 is described above using the MFP 13, the output process may be applied to other electronic apparatuses. For example, the process execution request may be replaced with a projection request to the projector 14; or a display request, a writing request, an email transmission request, or a transfer request (requesting transfer of information to another apparatus) to a cloud board.

<Summary>

According to the service providing system 1 of the present embodiment, the information storage apparatus 10 can determine whether a received request is from an operation terminal on a network that is different from a network where the information storage apparatus 10 is located. When the received request is from an operation terminal on a different network different from the network where the information storage apparatus 10 is located, the information storage apparatus 10 can record an activity monitoring log including location information of the operation terminal.

An information processing system, an information storage apparatus, and a location information storing method according to embodiments of the present invention are described above. However, the present invention is not limited to the specifically disclosed embodiments, and variations and modifications may be made without departing from the scope of the present invention.

For example, instead of the activity monitoring log setting, the configuration information may include information indicating whether location information is to be stored (i.e., information indicating whether the information storage apparatus 10 is configured to store location information) or information indicating whether an operation terminal needs to send location information.

The information storage apparatus 10 may be configured to limit processes that can be performed for an operation terminal based on obtained location information of the operation terminal. For example, the information storage apparatus 10 may be configured to not perform a process requested by a process request sent from an operation terminal when a location of the operation terminal indicated by location information sent from the operation terminal is in a predetermined area (or not in the predetermined area). More specifically, the information storage apparatus 10 may be configured to reject a process request for the MFP 13 sent from an operation terminal and record an error when the location of the operation terminal indicated by location information is not within a predetermined range (distance) from the MFP 13. This configuration makes it possible to prevent execution of an unauthorized request.

The location information transmission determining unit 53 is an example of a first determining unit. The file-and-folder obtaining unit 52 is an example of a first transmission unit that transmits a request and location information to an information storage apparatus. The Web API 26 is an example of a second transmission unit that transmits configuration information to an operation terminal. The combination of the Web API 26 and the history manager 30 is an example of a storage control unit. The configuration information obtaining unit 51 is an example of a configuration information obtaining unit. The combination of the Web UI 24 and the history manager 30 is an example of a log information providing unit. The Web API 26 is an example of a second determining unit. The Web controller 29 or the Web API 26 is an example of a control unit.

An aspect of this disclosure provides an information processing system, an information storage apparatus, and a location information storing method that can store location information of an operation terminal that has accessed information stored in the information storage apparatus from a network different from a network where the information storage apparatus is located.

What is claimed is:

1. An information processing system, comprising:
an operation terminal; and
an information storage apparatus connected to the operation terminal,
wherein the operation terminal includes
a first determining unit that determines whether to send location information of the operation terminal to the information storage apparatus based on configuration information indicating whether the information storage apparatus is configured to store the location information, and
a first transmission unit that transmits the location information of the operation terminal together with a request to the information storage apparatus when the first determining unit determines to send the location information;
wherein the information storage apparatus includes
a second transmission unit that transmits the configuration information to the operation terminal,
a control unit that performs a process requested by the request, and
a storage control unit that stores, in a storage unit of the information storage apparatus, the location information of the operation terminal in association with information related to the process requested by the request; and
wherein when the configuration information indicates that the information storage apparatus is configured to store the location information, the control unit performs the process requested by the request only when the location information is received from the operation terminal together with the request.

2. The information processing system as claimed in claim 1, wherein the operation terminal further includes a configuration information obtaining unit that obtains the configuration information from the information storage apparatus.

3. The information processing system as claimed in claim 1, wherein the control unit does not perform the process requested by the request when the location information is not received from the operation terminal together with the request.

4. The information processing system as claimed in claim 1, wherein when the operation terminal is connected to a same network as the information storage apparatus, the control unit performs the process requested by the request even when the location information is not sent from the operation terminal together with the request.

5. The information processing system as claimed in claim 1, wherein the storage control unit
stores, in the storage unit, log information including the location information of the operation terminal sending the request, identification information of target information requested by the request, and a date and time of the request, and
does not store the log information in the storage unit when the storage unit already stores log information that includes the same identification information of the target information, the same location information of the operation terminal, and a date and time that is within a predetermined period of time from the date and time of the request.

6. The information processing system as claimed in claim 5, wherein the information storage apparatus further includes a log information providing unit that provides the log information stored in the storage unit to the operation terminal.

7. The information processing system as claimed in claim 1, wherein the information storage apparatus further includes a second determining unit that determines whether the operation terminal sending the request is on a same network as the information storage apparatus or a network that is different from the network where the information storage apparatus is located.

8. The information processing system as claimed in claim 7, wherein the storage control unit stores the location information of the operation terminal in the storage unit when the second determining unit determines that the operation terminal is on the network that is different from the network where the information storage apparatus is located.

9. An information storage apparatus, comprising:
a transmission unit that transmits configuration information to an operation terminal connected to the information storage apparatus, the configuration information indicating whether the information storage apparatus is configured to store location information of the operation terminal;
a control unit that performs a process requested by a request sent from the operation terminal; and
a storage control unit that stores, in a storage unit of the information storage apparatus, the location information of the operation terminal in association with information related to the process requested by the request,
wherein when the configuration information indicates that the information storage apparatus is configured to store the location information, the control unit performs the process requested by the request only when the location information is received from the operation terminal together with the request.

10. A method performed by an information storage apparatus connected to an operation terminal, the method comprising:
transmitting configuration information to the operation terminal, the configuration information indicating whether the information storage apparatus is configured to store location information of the operation terminal;
performing a process requested by a request sent from the operation terminal; and
storing, in a storage unit of the information storage apparatus, the location information of the operation terminal in association with information related to the process requested by the request,
wherein when the configuration information indicates that the information storage apparatus is configured to store the location information, the process requested by the request is performed only when the location information is received from the operation terminal together with the request.

* * * * *